July 13, 1965     I. E. WHITE     3,194,857
METHOD AND APPARATUS FOR PRINTING ON MOLDED PLASTIC
ARTICLES WHILE IN A MOLD
Filed June 19, 1962     8 Sheets-Sheet 1

INVENTOR:
IRVINE EVERARD WHITE
By: NOLTE + NOLTE
ATTORNEYS

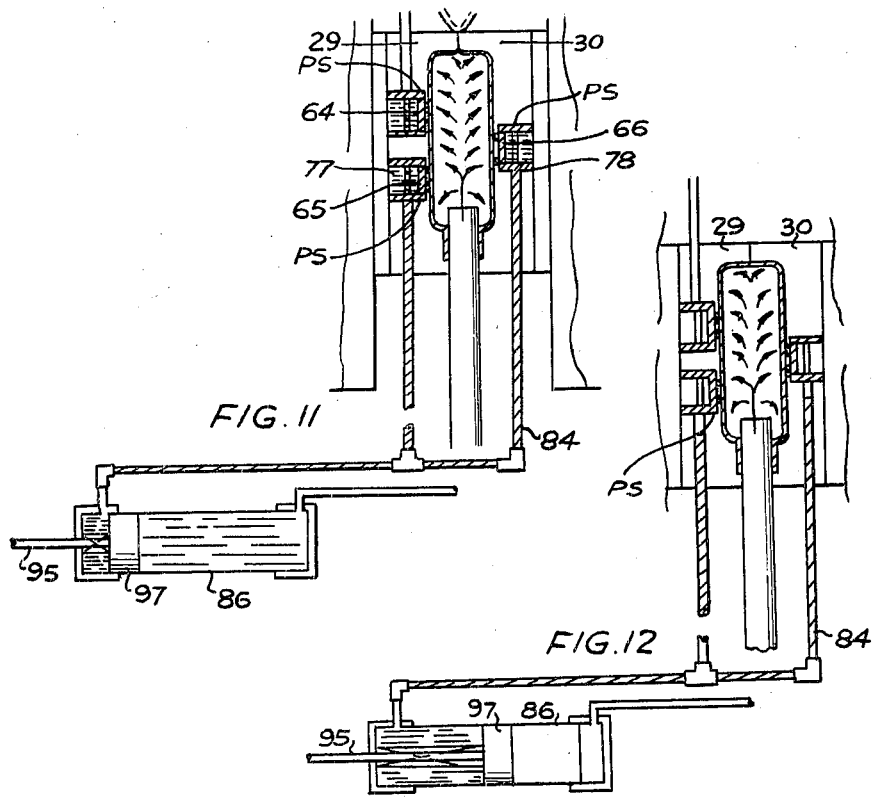
FIG. 11
FIG. 12
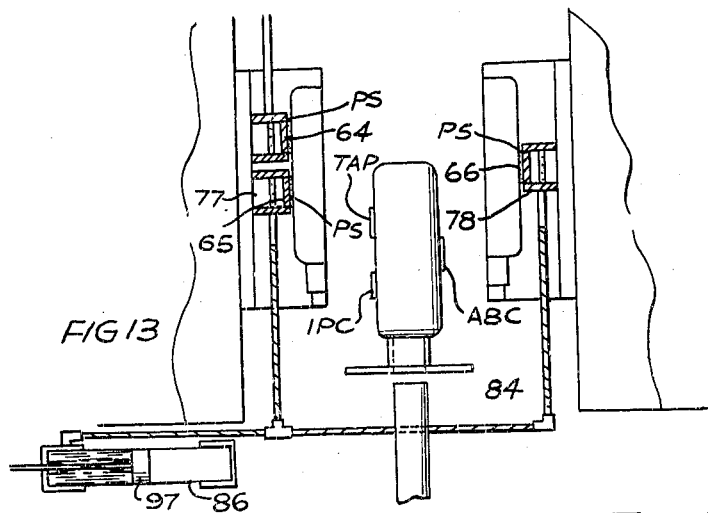
FIG. 13

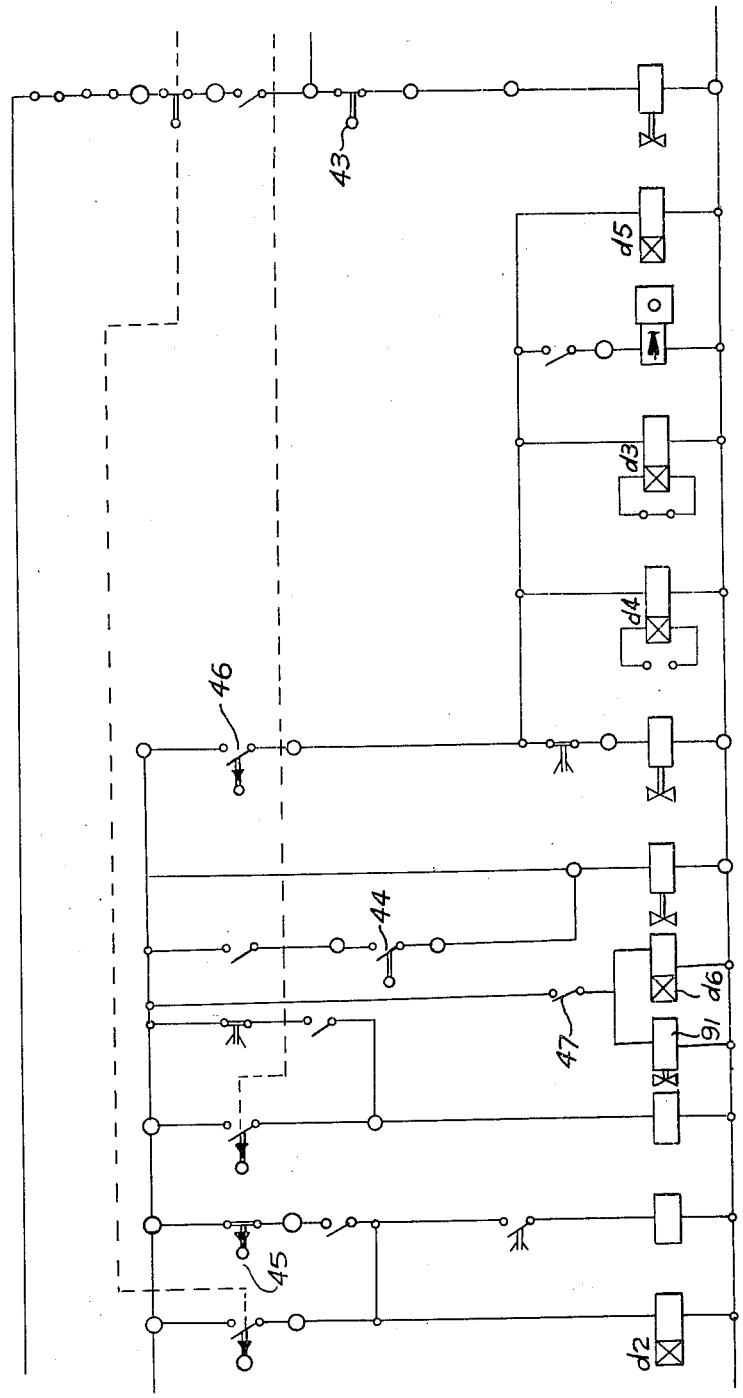

United States Patent Office 3,194,857
Patented July 13, 1965

3,194,857
METHOD AND APPARATUS FOR PRINTING ON MOLDED PLASTIC ARTICLES WHILE IN A MOLD
Irvine Everard White, Fishpool, England, assignor to Illingworth (Plastics) Limited
Filed June 19, 1962, Ser. No. 203,634
Claims priority, application Great Britain, June 28, 1961, 23,338/61; Oct. 9, 1961, 36,196/61; Dec. 23, 1961, 46,147/61
10 Claims. (Cl. 264—94)

This invention is for improvements in or relating to printing of moulded plastic articles, this expression "moulded plastic articles" including within its meaning primarily plastic bottles and in addition other articles such for example as moulded glass articles.

In producing plastic bottles it is usual practice to employ one apparatus in the form of an expansion blow moulding machine to produce the bottles, and a second entirely separate apparatus in the form of printing machinery for printing on the bottles. The printing process usually involves separate operations of flaming the bottles to oxidize the surfaces to be printed and then printing on the oxidized surfaces. If more than one colour is required, using the Silk Screen Method, each colour is applied in a separate operation.

An object of the invention is to provide improvements in the printing of plastic bottles such as to avoid the necessity for the usual separate printing processes thereby saving the time, labour, and the cost of the machines, that they involve.

The invention provides, in a machine for making moulded plastic articles hereinbefore referred to, printing means for printing on the articles during their production, said means comprising a pre-designed printing surface against which a surface of the article to be printed is urged for a predetermined period, fluid guide means for printing-fluid leading to said surface, and fluid control means operable on the printing fluid to press it through the printing surface on to the surface to be printed during said predetermined period. The invention also provides in a machine for producing moulded plastic hollow articles e.g. bottles by moulding, printing means for printing on the hollow articles during their production, said means comprising a member providing a pre-designed printing surface in at least one moulding die against which a surface of the article to be printed is urged for a predetermined period in the moulding of the bottle, fluid guide means for printing fluid leading to said surface, and fluid control means operable on the printing fluid to press it through the printing surface on to the surface to be printed during said predetermined period. The plastic hollow articles may be plastic bottles made by the blow moulding method.

Conveniently fluid pressure and suction means are provided operable in timed relation with the operations of the machine to not only press the fluid through the printing surface but also to retract the fluid back through the printing surface after leaving a deposit on the surface to be printed, all during said predetermined period.

Conveniently also the printing surface is provided on an insert in the moulding die, the insert being in the form of an absorbent pad. This pad may have its printing surface provided by a mask or screen. The pad may be made of sintered metal having a mask or screen formed by a thin welded-on plate chemically etched to required design with full and/or half tone effect.

In an alternative arrangement the printing surface may be provided by metal plating.

If desired the pad may be of felt like construction with a silk, nylon, or other mask or screen.

The pad may be disposed in the mouth of a chamber in the die, the mouth opening to the die surface, and the printing fluid is supplied to the chamber through piping having releasable connection to a duct in the die leading to said chamber and extending from a suitable pump and suitable control means.

Different colour effects may be provided by having a separate pad for printing inks of each colour from a separate supply and with separate control means; different pads for printing inks of the same colour may be connected up to the same supply and control means or to different supplies and control means. Any of the pads may be sub-divided or built up in different arrangements of partitioned sections each connected to a separate supply and control therefor for different colour effects.

The printing surface of the pad may be flat or provided with projections or recesses to correspond with projections and recesses on the surface of the article to be printed.

The invention also provides a method of printing on plastic articles while being produced in mouldable heated form which consists in using a continuous supply of printing fluid, urging the soft and heated material of each article in turn, where it is required to be printed, against a printing surface for a predetermined period, passing printing fluid from the supply under pressure not greater than the pressure on the article to and fro through the printing surface during each said predetermined period, and drying the resultant deposit of printing fluid on the articles in the final stage of curing the articles.

The invention further provides plastic articles printed in the machine and by the method as above.

The above and other features of the invention set out in the appended claims are incorporated in the construction which will now be described, as a specific embodied with reference to the accompanying drawings in which:

FIGURE 11 is a similar view to FIG. 10 showing the plastic bottle formed.

FIGURE 12 is a similar view to FIG. 11 at a stage immediately after printing on the bottle.

FIGURE 13 is a similar view to FIG. 12 showing the bottle released from the dies.

FIGURE 14 is part of an electrical circuit diagram for the machine.

Figure 1:
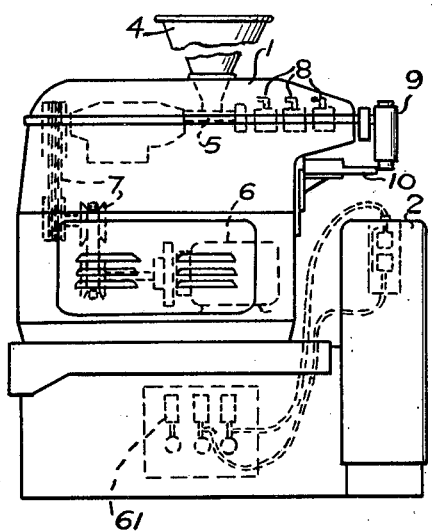
FIGURE 1 is a side view of an expansion blow moulding machine for producing plastic bottles according to the invention.
Figure 2:
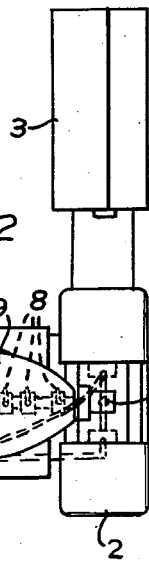
FIGURE 2 is a plan view of said machine.
Figure 3:
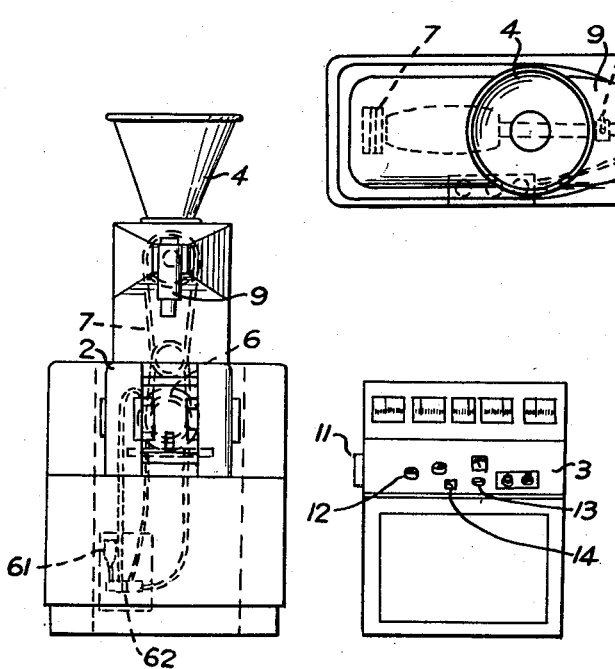
FIGURE 3 is a front view of said machine.

Referring to FIG. 1, the machine shown by way of example to illustrate the invention is that known as the Kautex-Werke Automatic Blow Moulding Machine and it consists briefly of an extruder 1, Type V8/11 a blow moulding die or closing unit 2 Type S40/11 and a control cabinet 3, FIGS. 2 and 3.

As is well known to those skilled in the art the extruder 1 includes a hopper 4 to receive the material to be extruded, a screw conveyor 5 under the hopper 4 and operable from a motor 6 through drive transmitting means indicated generally at 7 to convey the material past the known arrangement of heaters 8 to an extruder head 9 through which the material is extruded downwardly in tubular "parison" form. The extruder head 9 may be of various forms to extrude, one, two or more tubular parisons.

Associated with the extruder 1 there is a knife carried by a holder 10 for cutting the parison into required lengths.

The control cabinet as well known to those skilled in the art is constructed and arranged for controlling operation of the machine under control of electric switches represented at 11 to 13 and a cycle timer 14 which will be hereinafter again referred to.

Figure 4:
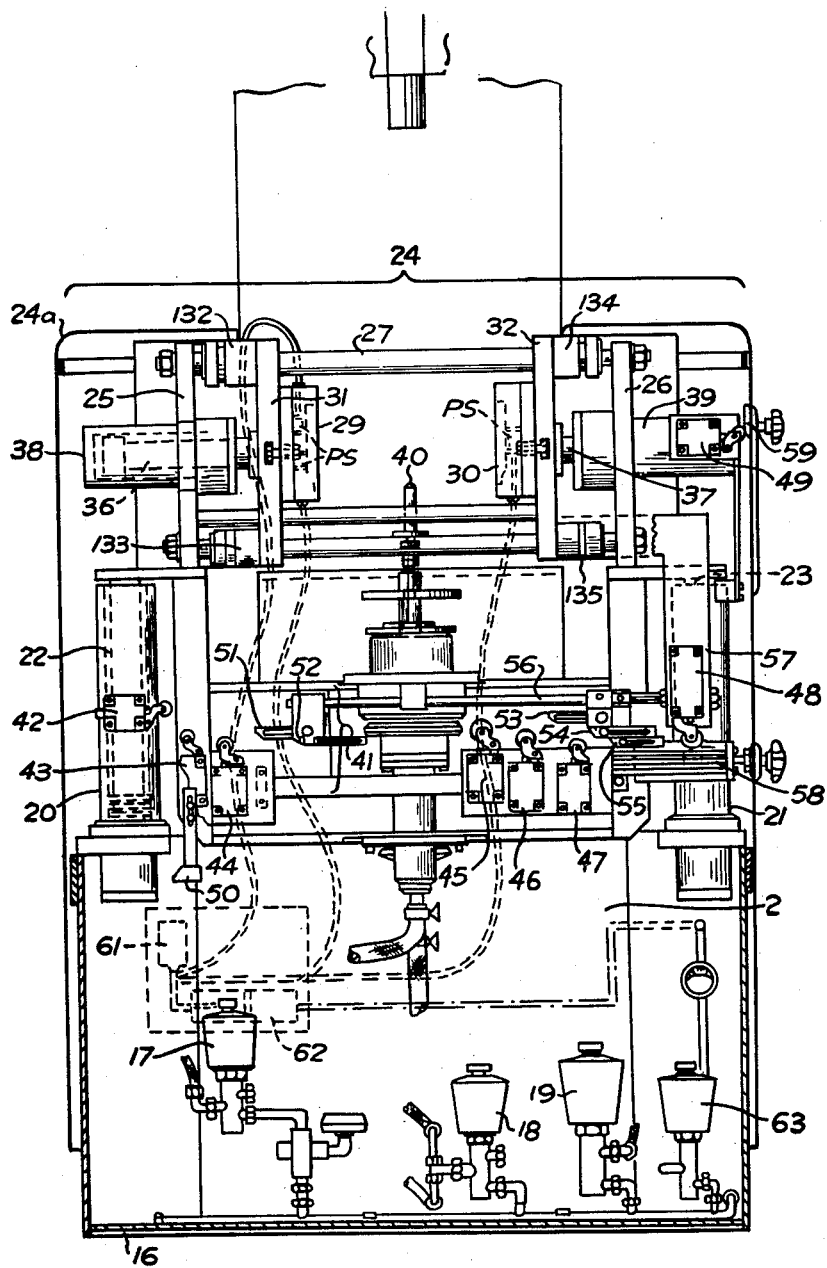
FIGURE 4 is an enlarged front view of the machine with front covers removed.

The blow moulding die unit 2, as more clearly shown in FIG. 4, and as well known in the art, comprises a base container 16 for a series of solenoid operated hydraulic control valves such as at 17 to 19 and it supports a pair of upright hydraulic cylinders 20, 21 in which operates pistons 22, 23 carried by an upper structure 24 having an outer casing 24a, the pistons and cylinders serving to raise and lower the upper structure 24 towards and away from the extruder head 9.

The upper structure 24 embodies fixed upright brackets 25, 26 to which are secured upper and lower horizontal guide rods 27, 28 for guiding moulding dies 29, 30 by their attachment to platens 31, 32 mounted by bushes 132 to 135 on said guide rods 27, 28. For effecting these movements of the moulding dies 29, 30 the platens 31, 32 are connected to pistons 36, 37 operating in hydraulic cylinders 38, 39 carried by the brackets 25, 26.

For injection of air into the parison to expand it, as well known in the art, there is embodied in the upper structure 24 a pressure air injector 40 mounted in a frame part 41.

For controlling operations of the machine, there are seven electric switches 42–46, 48, 49. The switch 42 on the hydraulic cylinder 20 is operable by a cam 50 on the upper structure 2; switches 43 to 46 on the upper structure are operable by cams 51–54 respectively on a slide bar 56 which is horizontally displaceable with the platen 32 through a connecting frame 57; switch 48 is carried by the frame 57 and is operated by a cam 58 on the upper structure; switch 49 on the hydraulic cylinder 21 is operated by a cam 59 on the upper structure.

In the usual operation of this machine, first the main switch 11 is switched on which includes for starting the heaters 8; then a switch 12 is switched on to start the extruder screw conveyor 5; next a switch 13 is switched on to start the usual hydraulic motor; the timing control 14 is also set. The usual front safety guard is inserted which operates a starting switch for automatic operation of the machine and starting with operation of the hydraulic jacks 20, 22 and 21, 23 for raising the platens which movement terminates in the cam 50 operating switch 42 for closing the platens 31, 32 by operation of the hydraulic jacks 36, 38 and 37, 39. After this the automatic operation continues by operation of the switches 43–46, 48, 49 in the usual manner.

Briefly the arrangement is that the closing movement of the platens causes cams 51–54 to operate their switches 43–46 whereby, through delay where appropriate, the respective solenoid valves are operated and the inward movement of the platens is cushioned, the knife holder 10 is operated to cut off the parison, the air blast is started from the injector 40, and the hydraulic jacks 20, 22 and 21, 23 operate to lower the upper structure 24. During this movement the parison is expanded against the dies 29, 30 by the air blast to form the bottle. At the end of the lowering movement cam 59 operates switch 49 to terminate the lowering movement. The timer then operates in usual known manner for opening the platens by the hydraulic jacks 36, 38 and 37, 39 and this opening movement is terminated by cam 58 operating switch 48 which also commences the next cycle.

In adapting this known machine for printing on the bottles according to the invention, there is provided, briefly, one or more suitably designed printing surfaces "PS" in at least one of the dies 29, 30, at least one supply of printing fluid of any suitable type in a reservoir 61 communicating with the printing surface, a piston and cylinder 62 for applying pressure and suction to the fluid, and a solenoid operated fluid control valve 63 under control of an electric switch 47 operable by a cam 55 carried by said sliding rod 56, with associated delay relay hereinafter referred to.

Figure 5:
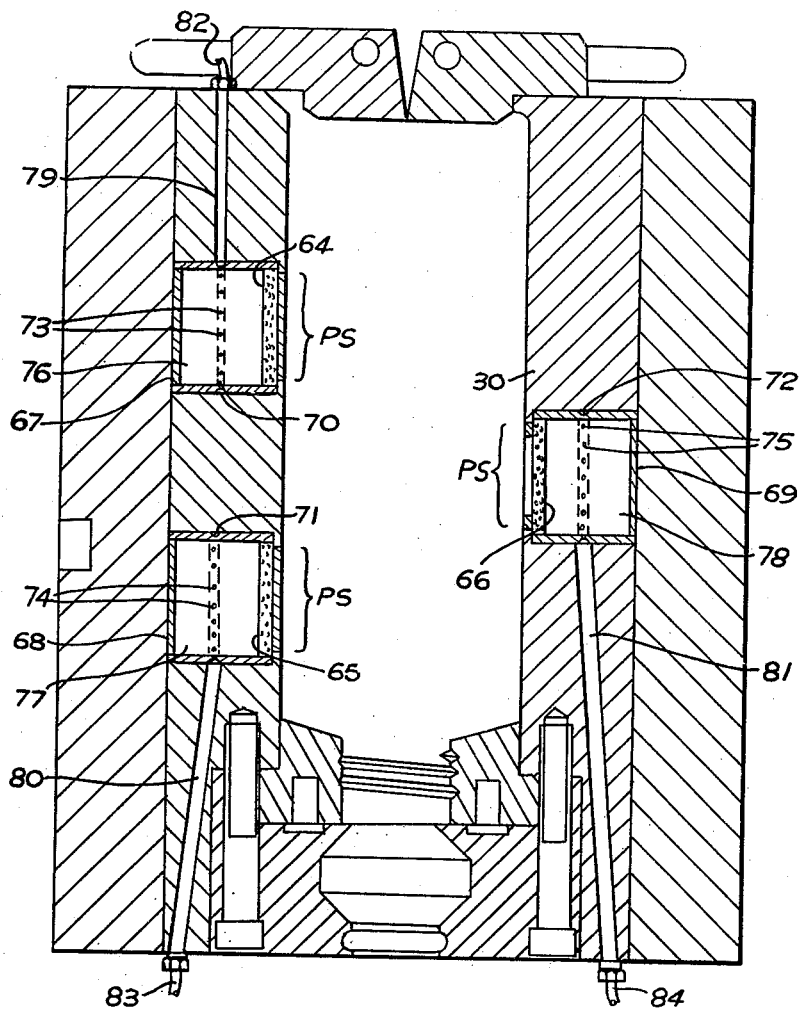
FIGURE 5 is a further enlarged sectional view of a plastic bottle formed between moulding dies of the machine.
Figure 6:
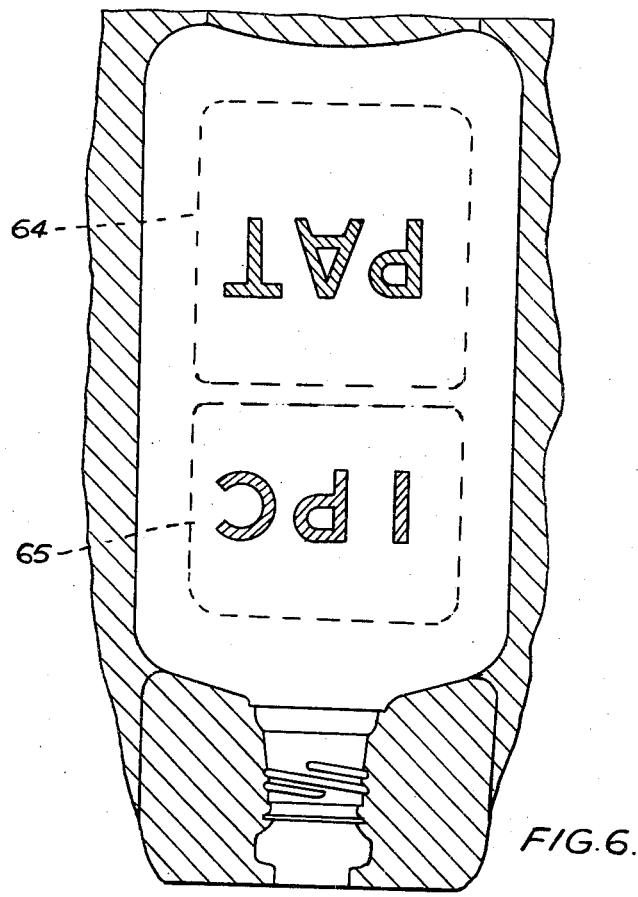
FIGURE 6 is a sectional view of FIG. 5.
Figure 7:
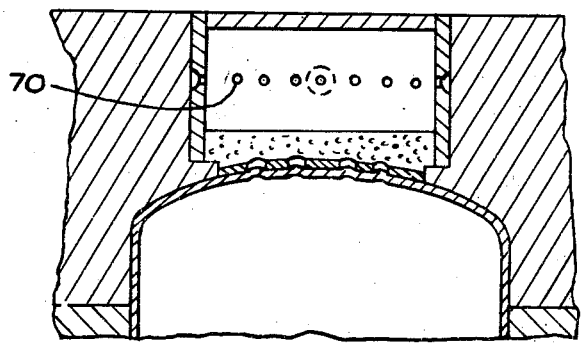
FIGURE 7 is a sectional plan view of FIG. 6.

More specifically, with reference to FIGURES 5 to 7, in this example three of said printing surfaces "PS" are provided, two in the die 29 and one in the die 30.

Each printing surface "PS" is formed in this example by an absorbent pad 64–66 of sintered bronze metal having a screen or mask by welding onto it during its production a thin copper plate say about .002 inch thick which is chemically etched to provide openings in the form of the required design in the copper plate through which the printing ink can pass.

It is to be understood that the pad and its screen or mask may be of any other suitable kind; for example the sintered metal pad may have a metal screen or mask formed on it by electro plating; in another example the pad may be felt-like with silk, nylon, or other suitable screen or mask.

It is also to be understood that the or each pad may be of any suitable shape with the printing surface conforming to the opposed surface of the bottle whether this be flat, curved, corrugated or other regular or irregular shape for printing on these surfaces; this is important in respect of some of the bottle surfaces which it has not been possible to print heretofore.

In the present example the pads are rectangular as indicated in FIGURE 6 and they have the letters PAT, IPC etched in their copper plate screen representative of a required design.

By the chemical etching method of producing the design, full tone and/or half tone effects may be obtained, the etching producing in effect a multiplicity of pin holes with suitable variations to vary the density of ink allowed to pass through different parts of the printing surface.

Each pad in this example is fitted in a casing 67–69 in the appropriate die, and an outer groove 70–72 (particularly FIGURE 7 for groove 70) is formed round the casing in communication with the interior chamber 73–75 by circumferentially spaced holes 76–78 in the casing.

From each casing there extends a fluid duct 79–81 to an outer edge of the die whereat there is fitted one end of a flexible fluid pipe 82–84.

The pipes 82 to 84 are connected to the printing ink supply. If only one colour is required there may be only one reservoir 61 and associated controls but if desired, and essentially if different colours are required, each pipe will be connected to its own reservoir and associated controls. In instances, hereinbefore referred to, where different compartments are provided for different coloured printing fluids by partitioning the partitions can be of such thin form that the different colours can be printed with their edges substantially in registry one with another, which has not heretofore been possible for plastic bottle printing.

Figure 8:
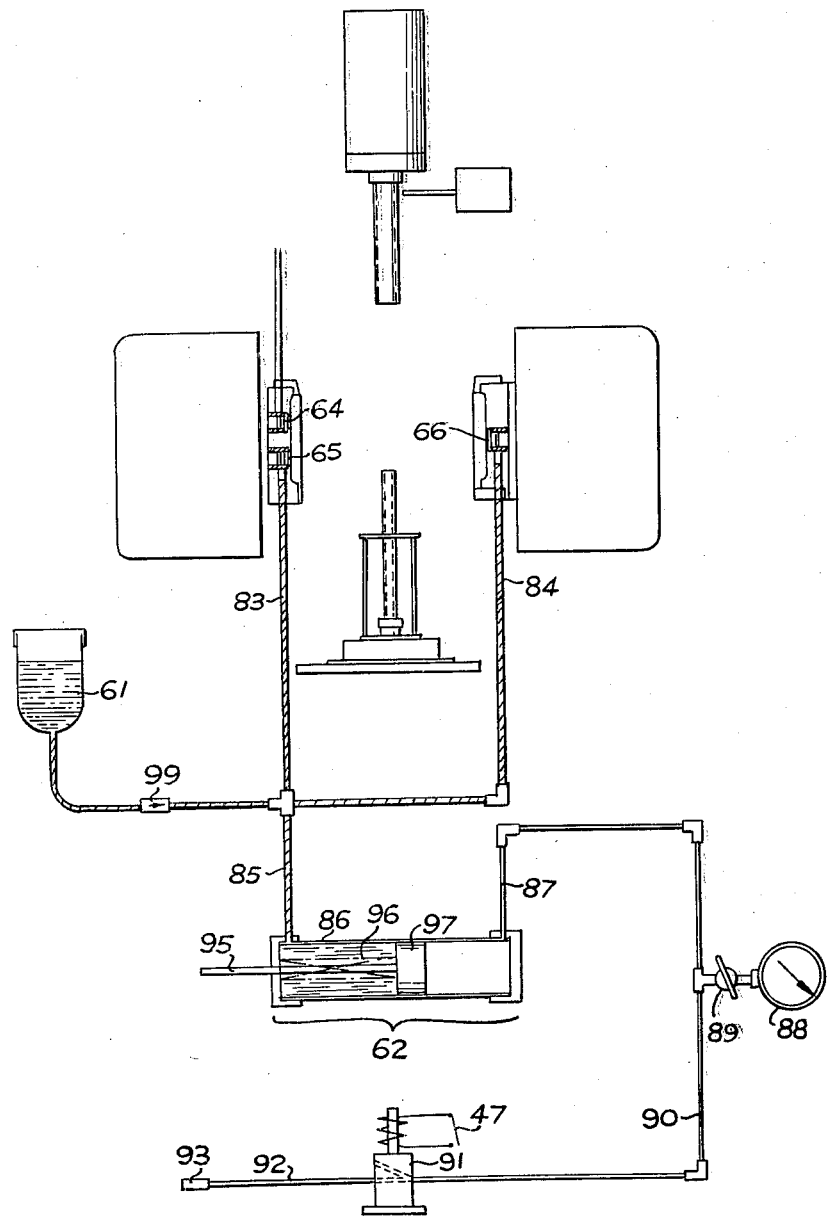
FIGURE 8 is a diagrammatic circuit diagram for printing fluid for printing on the bottles.

In the present example as shown in FIGURE 8 the pipes 83, 84 for the pads 65, 66 are connected in parallel to the single reservoir 61 with a pipe connection 85 to the single piston and cylinder pump 62. This pipe connection 85 is to one end of the cylinder 86 and from the other end of the cylinder 86 there is an air pipe connection 87 to an air pressure gauge 88 with associated control 89, and piping 90 connects the gauge to a solenoid operated valve 91 which is connected by piping 92 to a compressed air supply represented at 93, and there being the electric switch 47 for control of the solenoid 91, and the delay relay to be hereinafter again referred to.

The piston 95 in the cylinder 86 is biassed against the air pressure by a spring 96 behind the piston head 97.

There may be a one way control valve 99 in the piping leading from the reservoir 61.

The printing operation is carried out as follows with reference to FIGURES 9–13.

Figure 9:
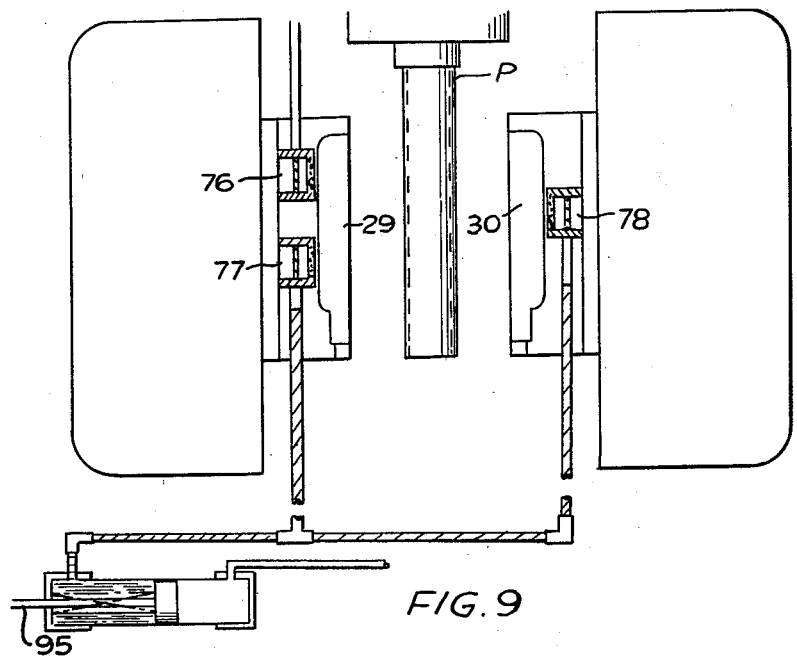
FIGURE 9 is a diagrammatic detail view of part of FIG. 8 with the moulding dies separated.

Referring first to FIGURE 9, this shows the stage whereat the required length of parison "P" has been extruded with the dies 29, 30 in the raised open position. The printing fluid at this stage is, as shown, below the level of the printing chambers 76–78, and the piston 95 is in its retracted position.

Figure 10:
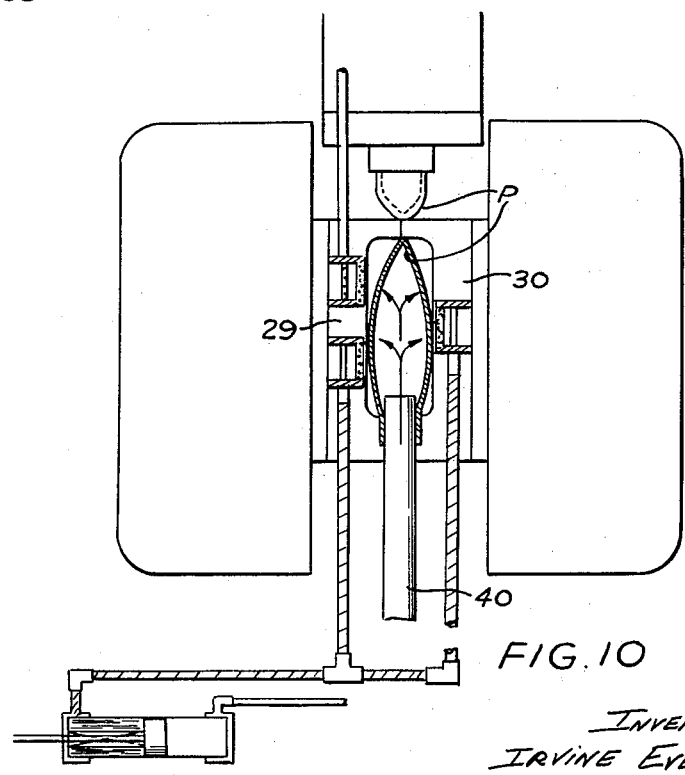
FIGURE 10 is a similar view to FIG. 9 with the moulding dies closed together.

At the following stage, FIGURE 10, the dies 29, 30 are in their closed position trapping an upper part and accommodating a lower part of the parison "P" between them. The injected air starts to expand this lower part of the parison "P" as shown, and eventually when the dies 29, 30 are fully closed, the bottle is fully formed, FIGURE 11.

The knife holder 10 is then operated to cut through the parison "P" and the dies 29, 30 start their descent. It is at or about this stage, when the material of the bottles is pressed by the air injection firmly against the dies and consequently firmly against the printing surfaces "PS" of the printing pads 64–66 that the solenoid valve 91 is operated to admit pressure air to the cylinder 86 causing a pressure stroke of the piston 95 as shown in FIGURE 11 thereby applying pressure to the printing fluid which by virtue of the one way valve 99 is forced along the pipes 83, 84 to the printing chambers 77, 78 from where the printing fluid passes through the absorbent pads 65, 66 and through the welded-on screen printing surfaces "PS" onto the surface of the bottle.

The solenoid valve 91 is under control of said delay relay because, like some of the existing electric switches such as at 43–46, the electric switch 47 is operated at an earlier time, i.e. when the dies 29, 30 close, than that required, i.e. when the bottle is fully formed against the dies. In illustration of this, FIGURE 14, which is part of the makers published circuit diagram No. 7,901,130,002-2, shows the existing arrangement of some of the electric switches such as at 43–46 and some of the delay relays d2–d5 and to this existing arrangement there is added in similar manner the electric switch 47 with the solenoid valve 91 and associated delay relay d6.

An important aspect of the invention is the next stage, FIGURE 12, whereat the dies 29, 30 are still closed but the pressure on the printing fluid has been relieved. More specifically the delay relay d6 is pre-set to return the solenoid valve 91 back to "off" position to relieve the air pressure behind the piston head 97 at predetermined time according to the amount of ink deposit required on the bottle, and in any event before the dies 29, 30 commence to re-open. The effect of this relieving the air pressure behind the piston head 97 is not only to relieve the ink pressure but also for the spring 96 to return the piston 95–97 in a suction stroke to retract the printing fluid (other than the deposit on the bottle) back through the pads 65, 66 and preferably sufficiently far back to be entirely clear of the pads; thus the pads and their screens are kept clean, and ink is now allowed to accumulate on or in them, or on the die surface.

Furthermore the controlled application and withdrawal of the ink enables the deposit of ink on the bottle to be just sufficient to obtain desired density of ink in the printing and maximum time thereafter for subsequent drying of the ink during the ensuing curing of the bottle which is effected in the usual known manner, this stage being shown in FIGURE 13, with the printing being indicated at TAP, IPC, and ABC, and the injector 40 having been lowered whereupon the bottle is ejected by an air blast in the usual known manner.

It will be observed from FIGURE 7 that the printing may be enhanced by being at least in part in relief on the bottle by portions of the bottle being pressed by the air blast partly into some of the openings in the screen on the pad. Furthermore the etching with advantage penetrates partly into the sintered metal of the pad as shown in FIGURE 7 thereby to ensure penetration completely through the welded-on screen.

It will be understood that the pad 64 effects its printing by like means and in like manner to that described for the pads 65, 66.

It is to be further understood that many modifications may be made without departing from the invention; For example, instead of having the delay relay d6, the switch 47 and cam 55 may be carried one by the upper structure 24 and the other by the lower container 16 in a manner to operate the solenoid operated valve 91 at the required time when the platens start to descend; the printing means may be built in the design of the machine or it may be produced as separate means to be subsequently attached to the machine; furthermore the printing means may be suitably arranged for use with other types of moulding machines, for example, with vacuum moulding machines or with apparatus by which glass articles are moulded in heat softened state whereby the printing is applied to the moulded glass articles.

What we claim is:

1. A combined moulding and printing apparatus, comprising a moulding die, a moulding face on said die, a printing pad mounted in the die, said pad including a printing surface at the moulding face, means for positioning a mouldable article in the die, means for pressing the moulding die and the mouldable article together to mould the article and to contact the printing surface with the article, means for providing a continuous supply of a printing medium, means for applying the printing medium under pressure through the printing pad and through the printing surface onto the article, and means for withdrawing a portion of the printing medium clear of the printing surface.

2. A combined moulding and printing apparatus, comprising a moulding die, a moulding face on said die, a printing pad mounted in the die, said pad including a printing surface at the moulding face, means for positioning a mouldable article in the die, means for pressing the moulding die and the mouldable article together to mould the article and to contact the printing surface with the article, means for providing a continuous supply of a printing medium, variable means for applying the printing medium under pressure through the printing pad and through the printing surface onto the article, and means for withdrawing a portion of the printing medium clear of the printing surface.

3. A combined moulding and printing apparatus, comprising a moulding die, a moulding face on said die, means for positioning a mouldable article in the die, a sintered metal block mounted in the die and having a chemically etched metal plating surface conforming to a surface of the article, means for pressing the moulding die and the article together to mould the article and to press the chemically etched metal plating surface and the article together into printing relationship, means for providing a continuous supply of a printing fluid, means for providing a passageway from the supply of the printing fluid to the sintered metal block, and alternately-operative pressure and suction means operably associated with said passageway for alternately applying the printing fluid through the sintered metal block and through the chemically etched plating surface under pressure and withdrawing a portion of the printing fluid clear of the chemically etched plating surface by suction.

4. A combined blow moulding and printing apparatus for mouldable hollow article, comprising a plurality of moulding dies, a moulding face on each die, sintered metal printing block means mounted in at least one of the moulding dies, means for inflating a hollow article against the moulding dies, means for providing at least one printing compartment in the sintered metal printing block means, said sintered metal printing block means including a chemically etched plating surface conforming to a surface of the hollow article, means for pressing the moulding dies together, with the hollow article between them, means for providing a continuous supply of printing fluid, means providing passageways from the printing fluid supply to the printing compartment, and a pressure and suction piston and cylinder operably associated with said passageways to alternately apply the printing fluid through said compartments in the sintered metal printing block means and through the chemically etched plating surface by a pressure stroke of the piston, and to withdraw the printing fluid clear of said chemically etched plating surface by a suction stroke of the piston.

5. A combined blow moulding and printing apparatus for mouldable hollow articles, comprising a moulding die, a moulding face on said die, a printing pad mounted in the moulding die and having a printing surface at the moulding face, means for positioning a mouldable hollow article facing the moulding die, means for pressing the moulding die and the printing surface against the mouldable hollow article and for inflating the hollow article against the moulding die and the printing surface, means for providing a continuous supply of a printing fluid, means for providing a passageway from the supply means to the printing pad, means for alternately applying pressure and suction on the printing fluid, said pressure and suction means including an air control valve and an electric switch connected to the valve whereby the actuation of the switch operates the valve thereby alternately applying pressure and suction to the printing fluid.

6. A combined blow moulding and printing apparatus for thermoplastic bottles and the like, comprising two moulding dies, each die including an opposed moulding face, means for positioning a hollow thermoplastic preform between the moulding dies, horizontal operating means for moving the moulding dies inwardly toward each other, means for inflating the preform, vertical operating means for lowering the moulding dies and preform while the moulding dies move inwardly and the preform is being fully inflated and pressed aganist the moulding dies, a printing pad mounted in at least one of the moulding dies, said pad including a printing surface at a surface of said one die, means for providing a continuous supply of printing fluid, means for providing a passageway from the supply of printing fluid to the moulding die and to the printing pad, a spring and air operated piston in a pressure and suction cylinder connected to said passageway means, an electrically operable air control valve means for controlling air to and from said cylinder, an electric switch for operating said air control valve means, a source of air connected to said cylinder through said air control valve, cam means connected to said horizontal operating means for operating said switch at a predetermined point in the movement of said dies toward each other thereby applying air pressure to said piston to stroke the piston and apply the printing fluid under pressure through the printing pad and through the printing surface onto the mouldable hollow article when the latter is fully inflated against the moulding dies, and means for initiating a return suction stroke of the piston thereby withdrawing a portion of the printing fluid clear of at least the printing surface.

7. Apparatus as claimed in claim 6 wherein said initiating means includes a delay relay operably connected between the electric switch and the electrically operable air control valve to delay the operation of the air control valve and thereby hold the pressure stroke of the piston until the mouldable hollow article is fully inflated against the moulding dies.

8. Apparatus as claimed in claim 6 wherein the cam means is carried by the vertical operating means to thereby operate the electric switch in the downward movement of the moulding dies precisely at the time required to initiate the piston's pressure stroke when the mouldable hollow article is fully inflated against the moulding dies.

9. A method of printing mouldable articles during the moulding operation in a combined moulding and printing machine having a moulding die movable against a mouldable article, a printing pad mounted in the moulding die, and means providing a continuous supply of a printing fluid to the printing pad which method comprises the steps of pressing the moulding die against the mouldable article, then applying pressure to the printing fluid in a direction to apply the fluid under pressure through the printing pad and onto the mouldable article, and then applying suction to the fluid in a direction to withdraw a portion of the fluid clear of at least the printing surface of the printing pad.

10. For use in a combined moulding and printing apparatus, a moulding died having an inner moulding surface which is upright during use of the apparatus and which is adapted to be engaged by a material to be moulded, said die being formed at said inner surface thereof with a recess extending from said inner surface into the body of said die and forming a printing chamber therein, a printing pad closing said chamber and having a printing surface substantially flush with said inner die surface, so that a suitable printing liquid passing through said pad and said printing surface will have access to surface of a mouldable material which is in said die in engagement with said upright inner surface thereof, and means communicating with said printing chamber for supplying printing liquid under pressure thereto while said upright inner surface of said die is engaged by a mouldable material and for retracting the printing liquid to an elevation below that of said pad and printing surface before the mouldable material is withdrawn from the upright inner surface of the die so, that the printing liquid will be applied to said pad and printing surface only during a time when a mouldable material which is to be printed is in engagement with said printing surface.

References Cited by the Examiner

UNITED STATES PATENTS

| | | | |
|---|---|---|---|
| 1,744,438 | 1/30 | Benson | 18—61 |
| 2,267,901 | 12/41 | Duncan | 101—129 |
| 2,523,234 | 9/50 | Rado | 18—61 |
| 2,601,700 | 7/52 | Pinsky et al. | 18—35 |
| 2,797,436 | 7/57 | Borkland | 18—35 |
| 3,009,415 | 11/61 | Harvey | 101—3 |
| 3,072,969 | 1/63 | Dubois | 264—132 |

WILLIAM J. STEPHENSON, *Primary Examiner.*

MICHAEL V. BRINDISI, *Examiner.*